Patented Oct. 7, 1941

2,257,820

UNITED STATES PATENT OFFICE 2,257,820

COLORED LUBRICANT

Isador Silverman, Newark, N. J., assignor to American Chain & Cable Company, Inc., New York, N. Y., a corporation of New York No Drawing. Application April 16, 1940, Serial No. 329,923

6 Claims. (Cl. 252—25)

This invention relates to the lubrication of wire ropes or cables and more particularly to the lubrication of one or more of the strands or other elements of such ropes.

In ordinary practice such lubrication is accomplished by coating the individual wires or strands with a suitable lubricating composition; such as, for example, a mixture of viscous petroleum oil and bodied linseed oil or the like. Various methods of application are used depending on the type of lubricant employed and on the particular equipment available at the point of manufacture of the rope. Where the wire rope is already in service, the lubricant may be applied by brush or by use of the conventional oil can or by spray; under conditions of manufacture, suitable drip device may be employed; or the rope may pass through a container or resurfacer of the lubricant which is provided with means for maintaining the lubricant in a fluid state while the wire rope is passing through it; or the lubricant may be applied by a suitable spray arrangement.

Such lubrication has, however, a strictly functional value, namely to reduce friction to which the individual strands of the cable are subjected while in use. The film of lubricant deposited is usually of one color and general appearance throughout and therefore does not permit differentiation of wire ropes of various sources of manufacture that have the same dimensional and structural characteristics. To make such differentiation possible, the practice has been followed of coating one or more strands of wire ropes with paints of characteristic color and conventional formulation, forming an easily observable contrast with the other portions of the rope coated with the lubricant. Such paint treatment, however, possesses no lubricating value. Moreover when the paint film is completely dry, that is the olea-resinous vehicle completely oxidized, it loses flexibility and flakes, scales or chips off under the mechanical strain and tension to which the cable is subjected in service. Thus while the a priori purpose for which the paint has been applied, namely the identification of the cable, is met by the use of paint, the subsequent functional usefulness of this treatment is virtually negative.

It is, therefore, one object of this invention to provide an improved lubricant which is adaptable as a means of differentiating wire ropes from different manufacturing sources. Conversely, it is an object of this invention to identify wire ropes or cable by applying a distinguishing color to one or more strands or other elements of the rope while at the same time providing adequate lubrication thereof.

Another object of this invention is to provide a lubricating composition which will function as a vehicle for a variety of coloring pigments.

Other objects of this invention will be readily discernible from the following description of the factors covering the formulation and of the properties essential to a composition which will serve dually and simultaneously as a satisfactory medium for the incorporation of pigments intended to identify wire ropes and as a lubricant.

As previously indicated, ordinary drying paints, while having the advantage of relative ease of application, lack lubricating properties; on the other hand fluid lubricants such as, for example, petroleum oils, are incapable of holding paint pigments in a state of uniform dispersion. To combine the two functions—lubrication and pigment dispersion, a composition is required which will be capable of thoroughly wetting and dispersing the pigments incorporated in it while in the fluid state and which will be capable of depositing a uniform coating on the surface of the wire rope. After such deposition, the composition must have positive adhesion and relatively high tenacity. Furthermore such composition must have a sharp transition temperature from the fluid to the solid state so that when applied to the surface of the rope in the fluid state it quickly solidifies to a continuous coating. In order to give satisfactory results the composition must have at the same time the characteristics essential to give desired lubrication and the properties as a vehicle for pigment that will permit thorough dispersion and dependable suspension of the pigment in the vehicle. When the colored lubricant is deposited over the metallic wires the pigment should be so dense and so evenly distributed that it would prevent the wire from being apparent through the thin layer of lubricant. Thus it was necessary in the development of my colored lubricant to discover and select a base for the same that had the desired properties of a lubricant and at the same time permitted the pigment to be absorbed, in sufficient quantity, to be thoroughly dispersed throughout the vehicle, and to be held in even suspension therein. Only in such manner was it possible to obtain a colored lubricant that would accomplish the dual purpose of this invention, viz: to give to one or more strands or other elements of a wire rope a color that was in contrast with the other strands or elements and would serve as a style of dress that would readily distinguish such rope from ropes of other makes, and second to provide the strand or other parts of the rope so colored with desired lubrication, which does not exist in the case of ropes having a strand or other element colored with paint or other non-lubricating material.

The ordinary practice is to apply the distinctive color to a single strand of a rope but obviously with a coloring composition like that herein described that serves both as a lubricant and as a color medium, the color may be applied to more than one strand or element of the rope.

In the selection of ingredients and development of a composition for simultaneously lubricating and coloring an element of wire rope, strand or cable consideration has to be given to the fact that the composition has to be applied in liquid form and that this involves the further fact that the grease contained in the lubricant has to be melted so that the color-carrying liquid can be sprayed or otherwise applied to the elements of the strand, rope or cable. This again emphasizes the fact that the lubricating material must be so compounded and the color pigment must be of such nature that the pigment can be thoroughly distributed throughout the vehicle and held in even suspension therein when the lubricant is in liquid form and that the pigment must remain thoroughly dispersed and evenly distributed throughout the lubricant when it becomes cold and partly solidified on the strand, rope or cable.

Obviously the composition herein described is adapted for use in connection with the identification and lubrication of all forms and styles of wire strand, wire rope and wire cable.

The above objects and characteristics are attained in accordance with the herein described invention by incorporating pigment or pigments into a blend of at least one polar substance, having a desirable dissociation potential, with at least one petroleum hydrocarbon which is solid at normal temperature and containing a substantial proportion of a residue extractible with acetone and having the characteristic property of oiliness or capacity for adhesion to metallic surfaces.

As an example of the first mentioned component of the vehicle we may use abietic acid, a common source of which is gum or wood rosin. As an example of the second mentioned component we may use a petrolatum of Pennsylvania origin having characteristics lying substantially within the following range:

Saybolt viscosity @ 210_____60–125
Melting point (ASTM)_____115–140
Color, Lovibond units_____110–130 Red. ½" cell
Acetone extractible_____5%–10%

If desired, we may in addition incorporate a minor proportion of paraffin wax to improve the setting properties of the composition at time of application to the cable.

In order to illustrate more specifically the composition in accordance with our invention, we set forth the following formula with the provision of course that our invention shall not be limited to the particular proportions or the specific ingredients herein enumerated.

A: The vehicle:

100 @ 210° F. viscosity 130° F. melting point
  petrolatum_____29%
"K" rosin_____52%
135 melting point paraffin wax_____ 9%

B: The pigment:

Chromium oxide_____10%

In preparing the colored lubricant with this vehicle, we incorporate the pigment or combination of pigments required to give the particular color desired, into sufficient proportion of the petrolatum to permit thorough grinding and thereafter extend the paste obtained with the remainder of the vehicle. This yields a colored lubricant having substantially the following composition:

Pigment _____10–15%
Vehicle _____90–85%

It is understood that we are not limited to the choice or amount of pigments or to the method of incorporating the pigment into the vehicle. The product obtained by formulating in accordance with the example given is a solid of grease-like consistency at normal temperature but has the characteristic of a non-settling dispersion in the molten state in which form we may apply it in any of the aforementioned manners, but preferably by such methods as will assure complete coverage of all of the unit parts of the wire rope members that are to be treated in a distinguishable manner.

It will be obvious that so far as the color or choice of pigments for the lubricant is concerned, many different combinations may be utilized within the spirit and scope of the invention. It is further understood that the invention is not limited to the specific ingredients indicated and therefore only such limitations should be imposed as are set forth in the following claims.

I claim:

1. As a new composition of matter, a pigmented lubricant for the coating of metallic wires and cables comprising coloring pigments and a vehicle consisting of a major proportion of rosin and a relatively lesser proportion of at least one petroleum hydrocarbon, solid at normal temperatures and containing a substantial proportion of a residue extractible with acetone.

2. As a new composition of matter, a pigmented lubricant for coating an element of metallic wire ropes and cables comprising coloring pigments and a vehicle consisting of a major proportion of rosin and a relatively lesser proportion of at least one petroleum hydrocarbon, solid at normal temperatures and containing a substantial proportion of a residue extractible with acetone.

3. As a new composition of matter, a pigmented lubricant for coating an element of metallic wire ropes and cables comprising coloring pigments and a vehicle consisting of a major proportion of rosin, a relatively lesser proportion of petrolatum characterized by having at least 5% of an acetone soluble fraction, and paraffin wax in an amount sufficient to raise the melting point of said composition to a degree sufficient to produce a sharp setting point for said composition.

4. A lubricating composition, solid at normal temperatures, capable of carrying pigments in suspension when in the molten state and consisting of a major proportion of rosin, a relatively lesser proportion of petrolatum characterized by having at least 5% of an acetone soluble fraction, and paraffin wax in an amount sufficient to raise the melting point of said petrolatum to a degree sufficient to produce a sharp setting point for the composition.

5. The method of identifying wire ropes which consists in applying a colored lubricant to an element thereof said lubricant consisting of from 10–15% coloring pigment and 85–90% of vehicle consisting of a major proportion of rosin, a relatively lesser proportion of petrolatum characterized by having at least 5% of an acetone soluble fraction, and paraffin wax in an amount sufficient to raise the melting point of the composition to a degree sufficient to produce a sharp setting point for said composition.

6. A wire rope comprising a plurality of strands wound about a central core, said rope characterized by having an element coated with a lubricant carrying identifying pigments in a permanently dispersed state, said lubricant consisting of a major proportion of rosin and relatively lesser proportion of petrolatum characterized by having at least 5% of an acetone soluble fraction, and paraffin wax in an amount sufficient to raise the melting point of said petrolatum to a degree sufficient to produce a sharp setting point for said lubricant.

ISADOR SILVERMAN.